(No Model.)
F. C. KIMBALL.
CHECK HOOK.
No. 378,795. Patented Feb. 28, 1888.
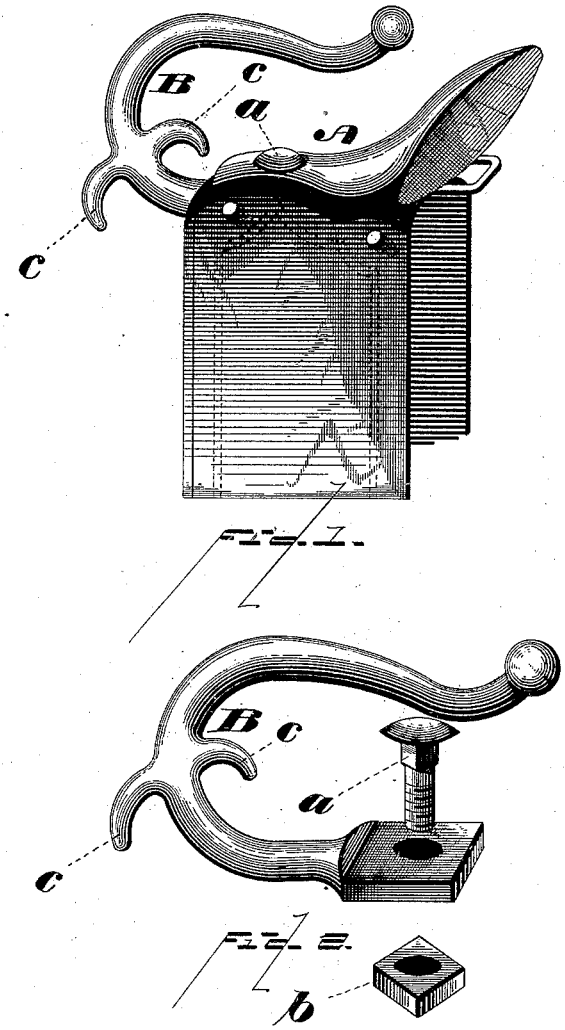
WITNESSES
F. C. Kimball
INVENTOR,
By James J. Sheehy
Attorney.

UNITED STATES PATENT OFFICE.

FREDDIE C. KIMBALL, OF JACKSON, MICHIGAN.

CHECK-HOOK.

SPECIFICATION forming part of Letters Patent No. 378,795, dated February 28, 1888.

Application filed December 20, 1887. Serial No. 258,479. (No model.)

*To all whom it may concern:*

Be it known that I, FREDDIE C. KIMBALL, a citizen of the United States, residing at Jackson, in the county of Jackson and State of Michigan, have invented certain new and useful Improvements in Check-Hooks; and I do declare the following to be a full, clear, and exact description of the invention, such as will enable others skilled in the art to which it appertains to make and use the same.

This invention relates to check-hooks; and it has for its object to prevent the check-line from accidentally leaving its proper position or becoming detached from the hook, and also to provide means which will tend to lift the forward portion of the saddle from the back of a horse should he pull hard upon the check line or rein.

It is well known that when a horse is checked tightly he pulls very much on the saddle by the checkrein, which is often the cause of sore backs; and again, when the check is tight and the animal suddenly throws his head backward, he will many times lift the rein from the hook and cause the objectionable necessity of the driver stopping and leaving his seat to check up. Again and on the other hand, the checkrein having so low a bearing, with my hook it effectually prevents the breaking or bending of the hook, which is of course a very important feature.

The invention will be fully understood from the following description and claims, when taken in connection with the annexed drawings, in which—

Figure 1 is a view of a gig-saddle showing my improved hook applied; and Fig. 2 is a perspective view of the hook removed from the saddle.

Referring by letter to the said drawings, A indicates a saddle, which I have shown as a gig-saddle, although it may be of any suitable character. B indicates my improved hook, which is mainly of a form similar to that of the ordinary check-hook, being curved forwardly, upwardly, and rearwardly, as shown, and having the usual aperture in its attaching-branch for the passage of the reception of a bolt, $a$, which secures it to the saddle by a nut, $b$, in the ordinary way. On the upwardly-curved portion of the hook, and on opposite sides, are formed outwardly and downwardly curved arms or stops C C, which are designed to prevent the check-line from rising off of the hook, and by having them arranged as shown they serve as a means of easing the saddle upon the back of the animal when he pulls on the checkrein, as it will be seen that, the horse's head being higher than his back, the pull will be upwardly and against the laterally-curved arms, thereby lifting the same and the saddle, to which they are secured. To this fact I attach great importance.

While it is preferable that the curved side arms should be arranged on the upwardly-curved side or portion of the hook about midway of its length, yet I do not wish to confine myself to the point where they are formed, as such may be varied according to dictation of the mechanic.

Having described my invention, what I claim is—

1. As an improved article of manufacture, the check-hook herein described, having lateral arms or stops on the upwardly-curved portion thereof, substantially as specified.

2. As an improved article of manufacture, the check-hook herein described, having downwardly-curved arms arranged on opposite sides of the upwardly-curved portion thereof, and about midway of the height of the same, substantially as described or specified.

In testimony whereof I affix my signature in presence of two witnesses.

FREDDIE C. KIMBALL.

Witnesses:
 HORACE HUNT,
 E. H. HOVEY.